(12) United States Patent
Alberts et al.

(10) Patent No.: US 10,036,122 B2
(45) Date of Patent: Jul. 31, 2018

(54) COMPOSITE MATERIAL COMPRISING BIO-FILLER AND SPECIFIC POLYMER

(75) Inventors: Albert Henderikus Alberts, Amsterdam (NL); Gad Rothenberg, Oegstgeest (NL)

(73) Assignee: Plantics B.V., Arnhem (NL)

( * ) Notice: Subject to any disclaimer, the term of this patent is extended or adjusted under 35 U.S.C. 154(b) by 824 days.

(21) Appl. No.: 14/110,598

(22) PCT Filed: Apr. 13, 2012

(86) PCT No.: PCT/EP2012/056842
§ 371 (c)(1),
(2), (4) Date: Nov. 23, 2013

(87) PCT Pub. No.: WO2012/140237
PCT Pub. Date: Oct. 18, 2012

(65) Prior Publication Data
US 2014/0061554 A1 Mar. 6, 2014

Related U.S. Application Data

(60) Provisional application No. 61/475,431, filed on Apr. 14, 2011, provisional application No. 61/475,411, filed on Apr. 14, 2011.

(30) Foreign Application Priority Data

Apr. 14, 2011 (EP) .................................... 11162428
Apr. 14, 2011 (EP) .................................... 11162445

(51) Int. Cl.
| | |
|---|---|
| *C08L 97/02* | (2006.01) |
| *C08L 67/00* | (2006.01) |
| *C08L 1/02* | (2006.01) |
| *C09K 21/14* | (2006.01) |
| *D21H 17/53* | (2006.01) |
| *C08J 5/04* | (2006.01) |
| *C08J 5/24* | (2006.01) |
| *C08L 97/00* | (2006.01) |

(52) U.S. Cl.
CPC .............. *D21H 17/53* (2013.01); *C08J 5/045* (2013.01); *C08J 5/24* (2013.01); *C08L 1/02* (2013.01); *C08L 67/00* (2013.01); *C08L 97/02* (2013.01); *C09K 21/14* (2013.01); *C08J 2367/00* (2013.01); *C08L 97/00* (2013.01); *C08L 2205/16* (2013.01)

(58) Field of Classification Search
CPC ....................................................... C08L 97/02
USPC ......................................................... 252/603
See application file for complete search history.

(56) References Cited

U.S. PATENT DOCUMENTS

| | | | | | |
|---|---|---|---|---|---|
| 4,359,096 | A | * | 11/1982 | Berger ................... | A62C 5/024 169/44 |
| 4,966,920 | A | * | 10/1990 | Gainer ............... | C08G 18/4018 521/103 |
| 5,156,775 | A | * | 10/1992 | Blount ................... | C09K 21/12 106/18.13 |
| 2008/0221265 | A1 | * | 9/2008 | Sodergard ............ | C08G 83/005 524/599 |
| 2010/0015420 | A1 | * | 1/2010 | Riebel .................... | B32B 27/06 428/203 |
| 2010/0063180 | A1 | * | 3/2010 | Kang .................... | A62D 1/0064 523/337 |
| 2012/0291377 | A1 | * | 11/2012 | Riebel .................... | B32B 27/36 52/232 |
| 2014/0061554 | A1 | * | 3/2014 | Alberst .................. | C08J 5/045 252/603 |
| 2014/0377568 | A1 | * | 12/2014 | Riebel .................... | B32B 27/36 428/446 |

FOREIGN PATENT DOCUMENTS

| | | |
|---|---|---|
| EP | 1219695 | 7/2002 |
| WO | 2010/007891 | 1/2010 |

OTHER PUBLICATIONS

International Search Report for PCT/EP2012/056842 dated May 11, 2012.

* cited by examiner

*Primary Examiner* — Nicole M Buie-Hatcher
*Assistant Examiner* — M. Reza Asdjodi
(74) *Attorney, Agent, or Firm* — McBee Moore Woodward & Vanik IP, LLC

(57) ABSTRACT

A composite material comprising 10-98 wt. % of a bio-based particulate or fibrous filler and at least 2 wt. % of a polyester derived from an aliphatic polyalcohol with 2-15 carbon atoms and a polyacid, wherein the polyacid comprises at least 10 wt. % of tricarboxylic acid.
Preferably, the filler is in the form of particles, fibers, and/or random or non-random layers. A plant-based filler may be used, in particular a cellulosic or lignocellulosic material, more in particular one or more materials selected from wood chips, wood flakes, sawdust, pulp, e.g., pulp of (recycled) paper or other fiber pulp, and plant-derived fibers such as cotton, linen, flax, and hemp. An animal-derived filler, in particular an animal-derived fiber such as wool, hair, silk, or feathers may also be used.
Preferably the polyalcohol is selected from one or more of glycerol, sorbitol, xylitol, mannitol, 1,2-propane diol, 1,3-propane diol, and 1,2-ethane diol, in particular glycerol. The polyacid preferably is an aliphatic diacid or triacid with 3-15 carbon atoms. Examples of suitable acids include citric acid, succinic acid, and itaconic acid.
The composite material according to the invention has fire-retardant properties, which makes it particularly suitable for applications where fire-retardancy is an issue.

20 Claims, No Drawings

COMPOSITE MATERIAL COMPRISING BIO-FILLER AND SPECIFIC POLYMER

CROSS REFERENCE TO RELATED APPLICATIONS

This application is a § 371 National Stage Application of PCT/EP2012/056842, filed Apr. 13, 2012, which claims priority to European Application No. 11162428.4, filed Apr. 14, 2011, U.S. Provisional Application No. 61/475,431, filed Apr. 14, 2011, European Application No. 11162445.8, filed Apr. 14, 2011, and U.S. Provisional Application No. 61/475,411, Apr. 14, 2011.

BACKGROUND OF THE INVENTION

Field of the Invention

The present invention pertains to a composite material comprising a filler and a specific polymer. More in particular, the present invention pertains to a composite material comprising a bio-based particulate or fibrous filler and a specific polymer.

Description of Related Art

Composite materials comprising bio-based particulate or fibrous fillers are well known in the art. They include, for example, composite materials comprising plant-based fillers, such as MDF (medium density fiberboard), HDF (high-density fiberboard), plywood, oriented stand board (OSB) also indicated as flake or wafer board, particle board and paper-resin composites like Formica™. These materials comprise a plant-based particulate or fibrous filler in combination with a polymer to keep the material together.

Conventional polymers used in the manufacture of these types of composite materials have a number of disadvantages. Depending on their nature, they may cause the slow release of formaldehyde, composite materials containing them cannot be disposed of as organic waste, and when burned they may cause the release of undesirable components. The present invention now provides a composite material which solves these problems.

SUMMARY

The present invention pertains to a composite material comprising 10-98 wt. % of a bio-based particulate or fibrous filler and at least 2 wt. % of a polyester derived from an aliphatic polyalcohol with 2-15 carbon atoms and polyacid, wherein the polyacid comprises at least 10 wt. % of tricarboxylic acid.

DETAILED DESCRIPTION OF A PREFERRED EMBODIMENT

The polyester used in the present invention does not contain aromatic structures or N or S heteroatoms. More in particular, it consists essentially of carbon, hydrogen, and oxygen atoms.

It therefore shows a clean burning profile, a good HSE profile, and is also suitable for disposal as organic waste.

In contrast with composite materials based on conventional polymers, the composite material according to the invention can therefore be disposed of as organic waste.

The polymer slowly hydrolyzes in water. Thus, when the composite material is used as land-fill, the polymer will slowly degrade, making the bio-based particulate or fibrous filler available for biological degradation.

It has also surprisingly been found that the composite materials according to the invention show a high fire resistance. This makes the composite material according to the invention eminently suitable as building material and in other applications where fire-resistance is an issue. The composite according to the invention thus combines good technical properties with good disposal properties.

Another advantage is that the polymer used in the composite according to the invention may be derived in its entirety from renewable vegetable resources. It does not have to rely on fossil fuels.

Another advantage is that the composite according to the invention may be derived in its entirety from renewable bio-derived resources, in particular vegetable resources. It does not have to rely on fossil fuels.

The bio-based particulate or fibrous material is present in the composite material according to the invention as filler. If the amount of filler is less than 10 wt. %, a composite material with the desired properties may be difficult to obtain. If the amount of filler is above 98 wt. %, the amount of matrix polyester will be too low to provide the product with adequate properties.

In one embodiment, the filler is present in an amount of at least 20 wt. %, in particular at least 40 wt. %, more in particular at least 50%. In some embodiments, the amount of filler may be at most 95%, more in particular at most 90%.

The polyester is present in an amount of at least 2 wt. %. It may be preferred for the polyester to be present in an amount of at least 5 wt. %, still more in particular at least 10 wt. %.

The amount of polyester will be below 80 wt. %, because otherwise the amount of filler will be too low.

The filler is a bio-based particulate or fibrous filler. Within the context of the present specification the word bio-based refers to fillers which are derived from plant- or animal-based materials. Combinations of different types and materials of fillers may also be used.

In one embodiment the filler is a plant-based particulate or fibrous filler. In this case the filler may be a cellulosic or lignocellulosic material.

The filler may be in the form of individual particles or fibers, but also in the form of an aggregate material, e.g., in the form of woven or non-woven layers.

Within the context of the present specification the wording fiber encompasses monofilaments, multifilament yarns, threads, tapes, strips, and other elongate objects having a regular or irregular cross-section and a length substantially longer than the width and thickness.

In one embodiment, the fiber-type filler is in the form of a porous sheet-like material, e.g., in the form of a sheet wherein the fibers are oriented in a random or non-random manner.

In one embodiment the fibers are oriented in the layer in a random manner, e.g., in a non-woven sheet.

In another embodiment the fibers are oriented in a non-random manner. In the context of the present specification the wording oriented in a non-random manner is intended to refer to all structures wherein fibers are connected to each other in a more or less regular manner. Examples include woven layers, knitted layers, layers wherein the fibers are oriented in parallel, and any other layers wherein fibers are connected to each other in a repeating pattern. Examples of suitable materials are woven or non-woven layers of, e.g., cotton or linen.

In one embodiment, the layers have a mesh width in the range of 0.01 to 5 mm.

In another embodiment, the filler is based on a particulate material, e.g., in the form of powder, dust, pulp, broken fibers, flakes, or chips. Examples include wood chips, wood flakes, and sawdust, and pulp, e.g., pulp of (recycled) paper or other fiber pulp.

In another embodiment the filler is based on plant-derived fibers. Examples include cotton, linen, flax, hemp, etc.

The filler may also be based on animal-derived fillers, in particular on animal derived fibers such as wool, hair, and silk, and fibers derived from feathers, e.g., chicken feathers. Where suitable, other parts of offal may also be used.

It may be preferred for the filler to have a fibrous character or platelike character, e.g. as evidenced by the aspect ratio between the largest dimension, the length, and the smallest dimension, the thickness, being at least 3, in particular at least 5. In some embodiments the aspect ratio may be at least 10, or even higher. It is believed that the use of material with a fibrous or plate-like character will lead to a material with improved directional properties, e.g., increased strength.

The composite according to the invention may be obtained by combining the filler with the polymer or precursor thereof, and subjecting the combination to a curing step.

The combining of the filler with the polymer or precursor thereof may be carried out in various manners, depending on the type and amount of filler and polymer.

In one embodiment the polymer or precursor thereof is in liquid form.

In one embodiment, the filler is mixed through the liquid using conventional mixing apparatus. In another embodiment, the filler is brought into a mould and the liquid is applied onto the filler in the mould. In a further embodiment the composite material is a laminate which can be obtained, for example, by coating or impregnating the individual layers with a polymer or precursor thereof in liquid form. In all cases, the resulting combination of filler and liquid polymer is subjected to a curing step until a solid composite is obtained.

Combinations of different methods, e.g., combinations of laminates and mixed materials are also envisaged.

In one embodiment, the filler is combined with monomers in the liquid phase, and the combination is subjected to a curing step until a solid composite is obtained.

As indicated above, in another embodiment, the polyalcohol and polyacid are combined and subjected to polymerization conditions to form a polymer in liquid form. The liquid polymer is then combined with the filler, and the combination is subjected to a curing step until a solid composite is obtained.

In this embodiment the starting material is a polymer with a degree of polymerization which is such that the polymer is still liquid. In this specification, the liquid polymer which will later be combined with the filler may also be indicated as prepolymer.

In making the prepolymer the polymerization is carried out to such an extent that a liquid polymer is formed the viscosity of which is such that the filler material can be incorporated therein without miscibility problems. Optionally, the polymer may be heated to reduce its viscosity. It is within the scope of the skilled person to determine a suitable viscosity, taking the particular type of mixing, the nature and amount of filler, and the nature and amount of polymer into account.

If so desired, a solvent may be present in the reaction mixture during the manufacture of the prepolymer to result in a less viscous product. Solvent may be present, for example, in an amount of 5-50 wt. %, calculated on the total of polymer and solvent, in particular in an amount of 5-20 wt. %. Although other polar solvents can also be used, the use of water is preferred for environmental and cost reasons.

In general, the prepolymerisation may be carried out at a temperature in the range of 20 to 200° C., preferably in the range of 40 to 150° C., more preferably in the range of 40 to 130° C. The reaction may be carried out at atmospheric pressure, but if so desired also at higher or lower pressures.

The degree of polymerization for the prepolymer may be in the range of 20 to 98 wt. % (calculated on the basis of the weight loss of the mixture), in particular in the range of 40 to 98 wt. %, or in the range of 20-50 wt. %. The degree of prepolymerisation will depend on the desired viscosity and on the further polymerization steps.

In another embodiment, the composite according to the invention may be obtained by combining the filler with a pre-polymer in the solid phase, and subjecting the combination to temperature and pressure to in the first instance melt the polymer to allow bonding to the filler, and then allow further polymerization of the polymer to solidify the material. In this embodiment, the polymer may be provided, e.g., as particles or as films.

In the following, the polymerization reaction will be discussed. Except where indicated otherwise the following is applicable both to the polymerization carried out in the presence of filler and to the polymerization in the absence of filler, i.e., in the manufacture of the prepolymer.

The starting materials for the present invention are an aliphatic polyalcohol with 2-15 carbon atoms and a polyacid, wherein the polyacid comprises at least 10 wt. % of tricarboxylic acid.

The polyalcohol used in the present invention does not contain aromatic structures or N or S heteroatoms. More in particular the polyalcohol is an aliphatic polyalkanol containing only C, H, and O atoms. The polyalcohol used in the present invention comprises at least two hydroxyl groups, in particular at least thee hydroxyl groups. In general, the number of hydroxyl groups will be 10 or less, more in particular 8 or less, or even 6 or less.

The polyalcohol has 2-15 carbon atoms. More in particular, the polyalcohol has 3-10 carbon atoms.

It is preferred for the polyalcohol to contain no other non-carbon groups than hydroxyl groups. It is preferred for the alcohol to contain no heteroatoms, including oxygen, in its backbone.

In a preferred embodiment of the present invention the polyalcohol contains a relatively large number of hydroxyl groups in comparison with its number of carbon atoms. For example, the ratio between the number of hydroxyl groups and the number of carbon atoms ranges from 1:4 (i.e. one hydroxyl group per four carbon atoms, or 8 carbon atoms for a dialcohol) to 1:0.5 (i.e. 2 hydroxyl groups per carbon atom). In particular, the ratio between the number of hydroxyl groups and the number of carbon atoms ranges from 1:3 to 1:0.75, more specifically, from 1:2 to 1:0.75. A group of specifically preferred polyalcohols is the group wherein the ratio ranges from 1:1.5 to 1:0.75. Compounds wherein the ratio of hydroxyl groups to carbon atoms is 1:1 are considered especially preferred.

Examples of suitable polyalcohols include glycerol, sorbitol, xylitol, and mannitol, and, from the group of dialcohols 1,2-propane diol, 1,3-propane diol, and 1,2-ethane diol. The use of compounds selected from the group of glycerol, sorbitol, xylitol, and mannitol, is preferred, with the use of glycerol being particularly preferred.

The preference for glycerol is based on the following: In the first place glycerol has a melting point of 20° C., which allows easy processing, in particular as compared to xylitol, sorbitol, and mannitol, which all have melting points well above 90° C. Further, it has been found that glycerol gives a polymer of high quality, and thus combines the use of an easily accessible source material with good processing conditions and a high-quality product.

Mixtures of different types of alcohol may also be used.

It is preferred, however, for the alcohol to consist for at least 50 mole % of glycerol, xylitol, sorbitol, or mannitol, in particular of glycerol, preferably at least 70 mole %, more in particular at least 90 mole %, or even at least 95 mole %. In one embodiment the alcohol consists essentially of glycerol.

The use of glycerol which is a side product of the manufacture of biodiesel by the transesterification reaction of glycerides with mono-alcohols is a specific embodiment of the present invention. Suitable monoalcohols include C1-C10 monoalcohols, in particular C1-C5 monoalcohols, more in particular C1-C3 monoalcohols, specifically methanol. The glycerides are mono- di- and esters of glycerol and fatty acids, the fatty acids generally having 10-18 carbon atoms. Suitable processes for manufacturing biodiesel with associated glycerol are known in the art.

The polyacid does not contain aromatic structures or N or S heteroatoms. More in particular the polyacid is an aliphatic polycarboxylic acid containing only C, H, and O atoms. It is preferred for the polyacid to contain no other functional groups than carboxylic acid groups. It is preferred for the acid to contain no heteroatoms, including oxygen, in its backbone.

The polyacid comprises at least 10 wt. % of tricarboxylic acid, whether or not in combination with dicarboxylic acids, other tricarboxylic acids, and mixtures thereof.

In one embodiment the acid comprises at least 30 wt. % of tricarboxylic acid, calculated on the total amount of acid, preferably at least 50 wt. %. In one embodiment the amount of tricarboxylic acid is at least 70 wt. %, more in particular at least 90 wt. %, or even at least 95 wt. %. In one embodiment the acid consists essentially of tricarboxylic acid, wherein the word essentially means that other acids may be present in amounts that do not affect the properties of the material.

In one embodiment the acid comprises at least 10 wt. % of dicarboxylic acid, calculated on the total amount of acid, preferably at least 30 wt. %, more preferably at least 50 wt. %.

In one embodiment the amount of dicarboxylic acid is at least 70 wt. %.

In one embodiment the acid comprises a combination of at least 10 wt. % of tricarboxylic acid and at least 2 wt. % of dicarboxylic acid, more in particular at least 10 wt. % of tricarboxylic acid and at least 5 wt. % of dicarboxylic acid, or at least 10 wt. % of tricarboxylic acid and at least 10 wt. % of dicarboxylic acid. In this embodiment the weight ratio between the two types of acid may vary within wide ranges, depending on the properties of the desired material. In one embodiment, the dicarboxylic acid makes up between 2 and 90 wt. % of the total of dicarboxylic and tricarboxylic acid, in particular between 5 and 90 wt. %, more in particular between 10 and 90 wt. %, depending on the properties of the desired material. It is noted that the preferred ranges for the tricarboxylic acid specified above are also applicable to this embodiment.

It has been found that the use of a tricarboxylic acid, in particular citric acid, results in the formation of a high-quality composite material, in particular in combination with the use of a trialcohol such as glycerol. Not wishing to be bound by theory we believe that there are a number of reasons why the use of a tri-acid, in particular in combination with a tri-ol results in the formation of a high-quality composite material. In the first place, the use of a tri-acid, in particular in combination with a tri-ol, makes for a highly crosslinked polymer, resulting in increased strength. Further, where a tri-acid, and preferably also a tri-ol is used, there is a large possibility of acid or hydroxyl groups to physically or chemically interact with active groups on the filler. This leads to improved bonding between the filler and the polymer, which is a key desire in creating composite materials. The degree of interaction can be controlled by selection of the amount of triacid and trialcohol, and by selecting the degree of polymerization. It is noted that this is a key difference with composites based on di-acids polymerised with di-ols.

The dicarboxylic acid, if used, may be any dicarboxylic acid which has two carboxylic acid groups and, in general, at most 15 carbon atoms. Examples of suitable dicarboxylic acids include itaconic acid, malic acid, succinic acid, glutaric acid, adipic acid and sebacic acid. Itaconic acid and succinic acid may be preferred.

The tricarboxylic acid may be any tricarboxylic acid which has three carboxylic acid groups and, in general, at most 15 carbon atoms. Examples include citric acid, isocitric acid, aconitic acid (both cis and trans), and 3-carboxy-cis, cis-muconic acid. The use of citric acid is considered preferable, both for reasons of costs and of availability. The citric acid can be provided in anhydrous form. However, as the presence of water is not detrimental to the process, it is possible, and preferred to use citric acid monohydrate as starting material.

The molar ratio between the polyalcohol and the polyacid will be governed by the ratio between the number of reacting groups in the alcohol(s) and acid(s) used.

In general, the ratio between the number of OH groups and the number of acid groups is between 5:1 and 1:5. More in particular, the ratio may between 2:1 and 1:2, more specifically between 1.5:1 and 1:1.5, more preferably between 1.1:1 and 1:1.1. The theoretical molar ratio is 1:1.

The alcohol and the acid are combined to form a liquid phase. Depending on the nature of the compounds this can be done, e.g., by heating the mixture to a temperature where the acid will dissolve in the alcohol, in particular in glycerol. Depending on the nature of the compounds this may be, e.g., at a temperature in the range of 20-200° C., e.g., 40-200° C., e.g. 60-200° C., or 90-200° C. In one embodiment, the mixture may be heated and mixed for a period of 5 minutes to 2 hours, more specifically 10 minutes to 45 minutes, at a temperature of 100-200° C., in particular 100-150°, more in particular at a temperature in the range of 100-130° C.

If a solvent is added, e.g., water, the temperature may be lower, e.g., in the range of 40° C. or higher, e.g., at a temperature of 40-100° C., in particular 50-100° C., because the water will help to dissolve the acid in the alcohol, in particular glycerol. In this embodiment, the mixture may be heated and mixed for a period of 5 minutes to 2 hours, more specifically 10 minutes to 45 minutes, at a temperature in the specified range.

If so desired, a polymerisation catalyst may be added to the reaction mixture. Suitable catalysts for polyester manufacture are known in the art. They include, e.g., p-toluene sulphonic ester and tin oxalate, and sulphuric acid. It is within the scope of the skilled person to select a suitable catalyst.

It has been found, however, that the use of a catalyst is generally not required.

The polymer aimed for is the reaction product of polyalcohol and polyacid. Other components may be present in the reaction medium, but preferably not to an extent that they substantially interfere with the nature of the reaction product. Suitable components that may be present include catalysts and colorants. In one embodiment less than 20 wt. % of the reaction mixture should be made up of other components, preferably less than 15 wt. %, more preferably less than 10 wt. %. In some embodiments it may be preferred for the mixture to contain less than 5 wt. % of additional components, or even less than 2 wt. %. The above pertains to components which end up in the final product. For example, water or other solvents which are evaporated from the final product and other gaseous components that may be added, if any, are not included herein. The filler and other solid constituents are also not taken into account in the calculations in this paragraph.

The liquid mixture comprising alcohol and acid is brought to reaction conditions. Reaction conditions include a temperature of between 20° C. and 200° C., in particular The reaction temperature will depend on the desired reaction time and the presence or absence of a catalyst. In one embodiment the reaction temperature is between 50 and 150° C., in particular between 80 and 130° C. An increased temperature will result in an decreased reaction time. The selection of a higher temperature within the stipulated range will increase reaction rate, but will also increase the risk of undesirable side reactions such as decarboxylation. Taking the above into account it is within the scope of the skilled person to select a proper reaction temperature.

In one embodiment, the polymer is a glycerol-tricarboxylic acid polyester, in particular a glycerol citric acid polyester, with a carbon content of at most 43.00 wt. % and a hydrogen content of at most 5.40 wt. %.

In the process according to the invention the combination of the filler with the polymer or a precursor thereof is subjected to a treatment at elevated temperature and pressure until the polymer has solidified.

The solidification of the polymer generally means that the mixture has reached a degree of polymerization of at least 70%, in particular at least 80%, more in particular at least 90%, in some embodiments at least 95%.

It is preferred that the combination of polymer and filler is subjected to a temperature in the range of 20-200°, in particular 40-150° C., more in particular 80-130° C. and a pressure of 1-100 bar, in particular 2-50 bar, more in particular 2-20 bar, for a period of at least 5 minutes, until the polymer has solidified. For further preference on reaction times and temperatures reference is made to what is stated elsewhere in this document.

In one embodiment the temperature of the reaction mixture is not elevated above 130° C. before a conversion of at least 90% has been obtained. This may be attractive to prevent decomposition of the acid which may cause discoloration of the product and may affect the properties of the polymer. It is preferred that the temperature of the reaction mixture is not elevated above 130° C. before a conversion of at least 95% has been obtained, more in particular a conversion of at least 98%. It is believed that when the reaction is complete or substantially complete, the polymer will tolerate higher temperatures, because at that point in time the acid has already been polymerized, reducing the risk of decarboxylation. For example, it has been found that when the desired degree of conversion is reached, the polymer can be heated further to a temperature of, e.g., 150° C. without further problems. This means that it can be used in many industrial and technological applications. In one embodiment it is preferred for the temperature of the reaction mixture to be not elevated above 125° C. before a conversion of at least 90% has been obtained. A maximum temperature of 120° C. may be more preferred. It is also preferred that temperatures above these values are not reached before a conversion of at least 95% has been obtained, more in particular a conversion of at least 98%.

In one embodiment it is preferred for the reaction to be carried out for at least part of the time above the boiling point of water, that is, above the point where the vapor pressure of the liquid equals the environmental pressure surrounding the liquid. When the reaction is carried out at atmospheric pressure it is therefore preferred for the reaction to be carried out at a temperature above 100° C., more in particular at 105° C. or higher. When the reaction is carried at reduced pressure within this embodiment, the reaction may be carried out at lower temperatures, e.g., a temperature of between 80° C. and 100° C. at a pressure of 0.10 mbar.

The polymerization time will depend on the polymerization temperature and desired degree of polymerization, and may vary between wide ranges. In one embodiment, the polymerization time is between 5 minutes and 5 days. In the presence of catalyst at elevated temperatures the polymerization time could, e.g., be in the range of 5 minutes to 12 hours, more in particular 0.5 hours to 6 hours. The polymerization time may also be at least 1 hour, or at least 2 hours, or at least 4 hours. In one embodiment, the polymerization time in the range of 2 hours to 5 days, in particular 2 hours to 24 hours, more in particular in the range of 4 to 18 hours, still more in particular in the range of 8-20 hours.

Combinations of various temperature and pressure regimens may be envisaged.

In one embodiment the reaction mixture is kept at a temperature of between 100° C. and 130° C. for at least part of the period from the start of the reaction until a conversion of at least 90% is obtained. More specifically, it may be desirable to keep the reaction mixture at a temperature of between 100° C. and 130° C. for the entire period from the start of the reaction until the desired degree of conversion is obtained.

In one embodiment, the alcohol and acid are mixed at a temperature of 50-200° C. for a period of 5 minutes to one hour. The filler is added, and the mixture is then poured into a mould and kept there at a temperature of 50-200° C., in particular 80-150° C., more in particular 90-150° C. for a period of 0.5 hours to 5 days hours, in particular 2-36 hours.

In another embodiment, alcohol and acid are mixed with water in an amount of, say 2-10 wt. %, calculated on the total of acid at a temperature in the range of 40-100° C., in particular 40-80° C. for a period of 5 minutes to one hour. The filler is added, and the mixture can then by poured in the mould and processed as described above.

In one embodiment the prepolymer is at elevated temperature when it is combined with the filler, e.g., at a temperature of above 60° C., in particular above 80° C. In one embodiment the temperature is between 100 and 150° C. The advantage of the prepolymer having a relatively high temperature when it is combined with the filler is that it allows processing of a polymer with a relatively high degree of polymerization at acceptable viscosity. This ensures that the curing step of the final composite can be relatively short.

The rate of the polymerization may be increased by seeding the mixture with pulverized polymer, e.g., in an amount of 1-20 wt. %. This is believed to result in a material with a lower density.

It has been found that the polymers shows strong adherence to glass and metal. The final stages of the polymerization reaction, including the heat and pressure treatment of polymer and filler, are therefore preferably carried out in a vessel provided with a non-stick coating. This can be, for example, a Teflon coating, or a silicone rubber coating. Suitable coating materials are known in the art.

It may be preferred for the mixing and reaction stage to take place in an inert atmosphere, e.g., under nitrogen or argon, to prevent reaction of the polymer or the monomers with the oxygen from the air, which may result in yellowing of the polymer.

The polymer used in the present invention will slowly hydrolyze when brought into contact with water. The hydrolyzation speed will depend in the degree of polymerization. Accordingly, if a certain degree of degradability is desired, e.g., in packaging applications a lower degree of polymerization may be selected, e.g., between 70 and 90%. However, in cases where a more stable material is desired, with a longer degradation time, a higher degree of polymerization may be more attractive. In this case, a degree of polymerization of more than 90%, e.g., of at least 93%, at least 96%, or at least 98% may be aimed for.

In general, the materials with a lower degree of conversion will be more flexible than materials with a higher degree of conversion.

If so desired, the composite material according to the invention may encompass additional polymers. In one embodiment it may be preferred for these polymers to be degradable and/or based on biomaterials. Examples of suitable polymers include polymers derived from lactic acid, glycolic acid, cellulose, and bioethanol.

It is preferred for the material according to the invention to be free of epoxyresins and other resins containing N- and S-heteroatoms. In one embodiment, the composite material according to the invention contains less than 5 wt. % of epoxyresin, in particular less than 2 wt. % of epoxyresin.

In one embodiment the polymer used in the present invention contains less than 10 wt. % of compounds containing other atoms than O, C, or H.

The composition may contain additional components. Examples include inert fillers like ash, carbon, silica (sand), titania, and other inert materials.

The composite material may be in the form of a shaped body. Examples of shaped bodies include plates, extrudates, and any other three-dimensional shapes that can be derived from a mould.

In one embodiment the present invention pertains to a panel made from the composite material of the present invention. The panel may have, e.g. a thickness in the range of 1 mm to 4 cm, in particular of 2 mm to 2.5 cm. The plate may have a width of 10 cm to 3 m, in particular 20 cm to 2 m. The length of the panel may, e.g., be in the range of 30 cm to 5 meter, in particular 1 meter to 4 meter. The plates may also have circular or irregular shapes.

In another embodiment, the present invention pertains to a complex shaped object, i.e. and object which is not flat. Such complex shaped objects can be used for numerous applications.

The composite materials according to the invention have many uses.

It has been found that the composite material of the present invention is particularly attractive in applications where fire-hazards may exist.

Fire is a hazard which may occur in many locations, from the home to vehicles such as trains, planes, ships, trucks, and passenger cars, offices, factories, tunnels, and open locations. To prevent the risks associated with fire, flame-retardant materials are used in many locations. To improve the flame retardancy of a material, flame retardant additives are often incorporated therein. Such additives include halogenated flame-retardants containing, e.g., bromine, chlorine, or iodine, metal hydrates, and nitrogen and phosphorus-based flame retardants. It has been found, however, that these flame retardant additives may in themselves constitute a HSE risk. This goes in particular for the halogen-containing compound such as the bromine-containing compounds.

Thus, there is a need in the art for materials which catch fire only slowly, may show self-extinguishing properties, or may not catch fire at all. Such a material may be useful in many applications where the proliferation of fire is to be prevented. It has been found that the specific polyester used in the composite material of the present invention, and therewith the composite material itself, have good flame-retardant properties. More in particular, the composite material does not easily catch fire, may shows self-extinguishing properties, and may not catch fire at all.

The use of the specified composite material comprising the specified polyester makes it possible to reduce the content of flame-retardant additives such as halogenated flame-retardants, metal hydrates, and nitrogen and phosphorus-based flame retardants. Depending on the application, the use of the specified polyester may even make it possible to dispense with the use of flame-retardant additives such as halogenated flame-retardants, metal hydrates, and nitrogen and phosphorus-based flame retardants altogether.

The present invention thus also pertains to a kit of parts comprising a part susceptible to degradation by thermal loads and a part comprising flame retardant part. The kit of parts of the present invention has numerous further advantages, which will become apparent from the further specification.

The present invention pertains to a kit of parts comprising a part susceptible to degradation by thermal loads and a part comprising the composite material of the present invention, which comprises 10-98 wt. % of a synthetic particulate or fibrous filler and at least 2 wt. % of a polyester derived from an aliphatic polyalcohol with 2-15 carbon atoms and polyacid, wherein the alcohol comprises at least 50 mole % of glycerol, and the acid comprises at least 50 wt. % of tricarboxylic acid.

It has been found that the specific polyester used in the present invention shows good flame retardant properties. Additionally, it may in many applications be used without further flame retardant additives, in particular halogen-containing compounds, more in particular bromine-containing compounds, being required.

The wording "part susceptible to thermal loads" encompasses everything which, when subjected to fire or heat, suffers from degradation. They may, for example, burn, explode, melt, or suffer from a decrease in functional properties, e.g., mechanical properties.

The wording "kit of parts" as used within the present specification should be interpreted broadly. It encompasses a combination of a part susceptible to thermal loads and a part comprising the composite material according to the invention wherein the kit is provided together, e.g., in the situation wherein the two parts of the kit of parts are connected to form a single object, e.g., a television comprising a screen (the part susceptible to thermal loads) and a casing comprising the composite material. It also encompasses the situation wherein the part susceptible to thermal loads and the part containing the composite material are provided separately, e.g., in the situation where the part containing the composite material is combined with the part susceptible to thermal loads at the location of use, e.g., the use of panels comprising the polyester in a tunnel or building. In the latter case, it is not necessary to the parts to be combined in a permanent manner. The invention also provides for the situation wherein the kit of parts exists only temporarily.

In one embodiment the present invention pertains to an assembly comprising a part susceptible to degradation by thermal loads and a cover surrounding said part in whole or in part, wherein the cover comprises the composite material comprising the specified polyester.

The word cover in the present specification should be interpreted broadly. It encompasses housings surrounding a part susceptible to thermal loads, but it also encompasses shielding that may be placed between the possible fire location and the part susceptible to thermal loads.

An example of an assembly according to the invention is electronic apparatus provided with a casing, e.g., computers, televisions and other screens, audio and video apparatus, etc. In this embodiment that invention pertains to an electronic apparatus comprising electronic parts susceptible to thermal loads and a casing comprising the specified composite material.

A further example of a kit of parts or assembly according to the invention is a building structure provided with a panel comprising the specified composite material. Examples of building structures include homes, offices, factories, tunnels, and bridges.

Examples of panels include paneling for walls, floors, ceilings, doors, and shutters.

The present invention thus also pertains to panels comprising the specified composite material which are provided with fastening means for application in building structures.

A further example of an assembly according to the invention is a vehicle provided with a panel comprising the specified composite material. Panels may encompass, e.g., panels used in interiors of trains, planes, ships, trucks, and passenger cars. Examples include dashboard panels, side panels, shelves, seats and seat covers, fuel tanks and fuel tank shielding, etc.

In one embodiment, the properties of the flame retardant part are such that the time-to-degradation of the part susceptible to thermal loads is increased with at least 10% as compared to the situation where the part is subjected to a thermal load in the absence of a cover or casing. In particular, the time-to-degradation is increased with at least 30%, more in particular at least 50%, even more in particular at least 100%. The increase in time-to-degradation may in one embodiment be at least 200%, or at least 300%, or at least 400%.

In one embodiment the flame retardant part is substantially free from bromine-containing flame-retardant additives. In one embodiment the flame retardant part is substantially free from halogen-containing flame-retardant additives. In a further embodiment, the flame retardant part is substantially free from halogen-, nitrogen, or phosphorus-containing flame-retardant additives. In this context the word substantially free means that the compound is not added on purpose, and only present in amounts which cannot be avoided.

The present invention also pertains to a part and cover as described above.

The present invention also pertains to the use of the specified composite material as flame retardant material. In one embodiment, an intermediate product comprising said polyester is applied as a flame retardant material. The invention also pertains to said intermediate product.

The invention also pertains to a method for decreasing the fire-propagating properties of a system comprising incorporating therein a part comprising a composite material comprising the specified polyester. The invention also pertains to a fire protecting cover comprising the specific composite material comprising said polyester. In one embodiment, the cover is intended for protecting the human or animal body.

The present invention is illustrated by the following non-limiting examples.

Example 1—Composite Based on Paper Pulp

Glycerol (8 grams) and citric acid monohydrate (16 grams) were heated with 20 ml of demineralized water in an open beaker at 60° C. for 20 minutes. A homogeneous solution was obtained.

Paper pulp was prepared from 8 grams Kimberley Clark cellulose wipes in a mechanical blender with 200 ml water for 30 minutes. The polymer solution was added to the mush and blended for 20 minutes. The impregnated mush was cast in a silicone rubber mould (10*20*5 cm3) and cured at 120° C. for 12 hrs under a flow of nitrogen. A coherent composite material was obtained (dimensions 10*12*0.5 cm).

Example 2—Composite Based on Sawdust

Citric acid monohydrate (18 grams) and glycerol (9 grams) were heated to 100° C. for 15 minutes with stirring in an open beaker until a homogeneous solution was obtained.

Epoxy-free sawdust (8 grams) was added in portions with manual stirring/mixing with a steel spatula until a thick paste was obtained. The sawdust paste was cured in a silicone rubber cup (5 cm diameter) at 120° C. for 12 hrs. A porous brown fiber board (0.7 cm height) resulted with density lower than 1 g/ml.

Example 3—Composite Based on Sawdust

A sawdust paste was prepared as described in Example 2. The sawdust paste was spread out on a silicone rubber sheet. A second silicone rubber sheet was placed on top and the paste was cured under pressure of a 2 kg stone at 120° C. for 12 hrs. A porous brown coherent fiber board (7*8 cm and 0.5 cm thickness) was obtained with a density above 1 g/ml.

Example 4—Composite Based on Sawdust

A sawdust paste was prepared as described in Example 2. The paste was placed between two silicone rubber sheet and heated at 120° C. under 10 bars pressure. A thin sheet of brown medium density fiber board was obtained (7*10 cm and 1 mm thickness) with a density well above 1 g/ml.

Example 5—Composite Based on Non-Woven Paper Layers

A stack of 10 cellulose based sheets (7*10 cm Kleenex or Kimberley Clark) was impregnated with 5 grams of glycerol:citric acid resin (1:1 molar) which was prepared as described in Example 2. The stack was cured between two silicone rubber sheets placed between two ceramic tiles topped with a 2 kg stone weight for 12 hrs at 110° C. A rigid composite material was obtained.

Example 6—Composite Based on Woven Cotton Material

A stack of 10*10 cm of woven cotton sheets (5 layers of regular kitchen towel) was impregnated with 12 grams of glycerol:citric acid monohydrate (1:1 resin prepared as in Example 2) at a temperature of 75° C. The stack was cured at 125° C. for 12 hrs between silicone rubber sheets, the whole being placed between two ceramic tiles under a weight of 2 kg.

A rigid porous material (0.5 cm thickness) was obtained with a density below 1 g/ml.

Example 7—Composite Based on Woven Cotton Material

A stack of 10*10 cm of woven cotton sheets (10 layers of regular kitchen towel) was impregnated with glycerol/citric acid resin (1:1 molar ratio, 12 grams, prepared as in Example 2), at a temperature of 75° C.

The stack was cured at 120° C. under a pressure of 10 bars in a heat press between Teflon sheets for 12 hrs.

A stiff material with a thickness of 0.1 cm and a density above 1 g/ml was obtained.

Example 8—Composite Based on Sawdust

Glycerol (50 grams) and citric acid monohydrate (100 grams) were heated with stirring at 100° C. until a clear solution was obtained after 30 minutes. Epoxy-free dry sawdust (37 grams) was added in portions with stirring and the mushy paste was mixed by hand with an spatula. The paste was laid onto a silicone rubber sheet (12*12 cm). A second silicone rubber sheet was placed on top and the whole was cured at 100° C. between 2 ceramic tiles with a 2 kg stone weight on top.

A brown rigid porous density fiber board was produced, with a thickness of 0.8 cm.

Example 9—Composite Material Based on Hemp

A 4*4 cm hemp mat of 0.8 cm thickness was impregnated with glycerol citric acid monohydrate resin (7 grams, prepared as described in Example 2) and the sample was cured between silicone rubber sheets placed between two ceramic tiles under a weight of 2 kg. The sample was cured at 135° C. for 12 hrs.

A porous rigid brown composite was obtained with a density below 1 g/ml.

Example 10—Composite Based on Regenerated Cellulose

Wet regenerated cellulose (12 grams) was impregnated with glycerol citric acid monohydrate resin (prepared as in example 2) at 75° C. The sample was cured between two silicone rubber sheets placed between two ceramic tiles under a pressure of 2 kg weight.

A smooth sheet of tanned composite (appr. 10*10 cm and 0.5 mm thickness) was obtained.

The invention claimed is:

1. A composite material comprising from 10 to 98 wt. % of a bio-based particulate or fibrous filler and at least 2 wt. % of a polyester derived from an aliphatic polyalcohol with from 2 to 15 carbon atoms and a polyacid, wherein the polyacid comprises at least 90 wt % citric acid.

2. The composite material according to claim 1, wherein the filler is in the form of particles, fibers, and/or random or non-random layers.

3. The composite material according to claim 1, wherein a porous sheet-like material is used as filler.

4. The composite material according to claim 1, wherein a particulate material, optionally in the form of a powder, dust, flakes, or chips, is used as filler.

5. The composite material according to claim 1, wherein a plant-based filler is used, optionally a cellulosic or a lignocellulosic material, optionally at least one material selected from the group consisting of wood chips, wood flakes, sawdust, pulp, optionally pulp of recycled or unrecycled paper or other fiber pulp, and plant-derived fibers optionally comprising cotton, linen, flax, and/or hemp.

6. The composite material according to claim 1, wherein an animal-derived filler, optionally an animal-derived fiber optionally comprising wool, hair, silk, and/or feathers is used as filler.

7. The composite material according to claim 1, wherein the polyalcohol is selected from at least one of glycerol, sorbitol, xylitol, mannitol, 1,2-propane diol, 1,3-propane diol, and 1,2-ethane diol, and optionally comprises glycerol.

8. The composite material according to claim 1, wherein the filler is present in an amount of at least 20 wt. %, optionally at least 40 wt. %, optionally at least 50%, and/or optionally at most 95%, or optionally at most 90%.

9. A method for manufacturing a composite material according to claim 1, comprising combining the filler with the polyester or precursor thereof to form a composite material combination, and subjecting the combination to curing.

10. The method for manufacturing a composite material according to claim 9, wherein the filler is combined with alcohol and acid monomers in a liquid phase, which is subjected to curing until polyester has solidified.

11. The method for manufacturing a composite material according to claim 9, comprising combining alcohol and acid and subjecting the alcohol and acid to polymerization conditions to form a polyester in liquid form, combining the liquid polyester with the filler, and subjecting the combined polyester and filler to curing until composite material has solidified.

12. The method according to claim 9, wherein the curing comprises subjecting the combination of filler and polyester to a temperature in a range of from 20 to 120° C., optionally from 40 to 150° C., or optionally from 80 to 130° C. and a pressure of from 1 to 100 bar, optionally from 2 to 50 bar, or optionally from 2 to 20 bar, for a period of at least 5 minutes, until composite material has solidified.

13. A kit of parts comprising a part susceptible to degradation by a thermal load and a part comprising a composite material according to claim 1.

14. The kit of parts according to claim 13, which is an assembly comprising a part susceptible to degradation by a thermal load and a cover surrounding said part in whole or in part, wherein the cover comprises a polyester derived from an aliphatic polyalcohol with from 2 to 15 carbon atoms and a polyacid, wherein the polyacid comprises at least 10 wt. % of tricarboxylic acid.

15. A method for decreasing fire-propagating properties of a system comprising incorporating therein a part comprising a composite material according to claim 1.

16. A fire-protecting cover comprising a composite material according to claim 1.

17. A fire-protecting cover according to claim 16, which is intended for protecting a human and/or an animal body.

18. The composite material according to claim 1, wherein the polyalcohol comprises glycerol.

19. The composite material according to claim 1, wherein the acid is 100 wt % citric acid.

20. The composite material according to claim 1, wherein the polyacid further comprises a dicarboxylic acid selected from at least one of succinic acid and itaconic acid.

* * * * *